United States Patent [19]

Bogdan et al.

[11] Patent Number: 5,554,207
[45] Date of Patent: Sep. 10, 1996

[54] PROCESS OF RECYCLING IRON OXIDES AND PLASTICS IN STEELMAKING

[75] Inventors: Eugene A. Bogdan, North Huntingdon; Alvin A. Terchick, Monroeville, both of Pa.

[73] Assignee: USX Corporation, Pittsburgh, Pa.

[21] Appl. No.: 344,868

[22] Filed: Nov. 25, 1994

[51] Int. Cl.⁶ .................................................. C21B 3/04
[52] U.S. Cl. .......................... 75/500; 75/544; 75/569; 75/767; 75/961
[58] Field of Search .......................... 75/500, 501, 502, 75/767, 961, 569, 544

[56] References Cited

U.S. PATENT DOCUMENTS

| | | |
|---|---|---|
| 2,888,342 | 5/1959 | Fraser . |
| 3,525,604 | 8/1970 | van Dornick ............................ 75/502 |
| 3,644,113 | 2/1972 | Lang et al. . |
| 3,898,076 | 8/1975 | Ranke . |
| 4,040,818 | 8/1977 | Clegg et al. . |
| 4,802,914 | 2/1989 | Rosen et al. . |
| 5,000,783 | 3/1991 | Dingeman et al. . |
| 5,364,441 | 11/1994 | Worner ...................................... 75/961 |

FOREIGN PATENT DOCUMENTS

| | | |
|---|---|---|
| 8027687 | 4/1972 | Japan . |
| 3006334 | 1/1991 | Japan ....................................... 75/767 |

*Primary Examiner*—Melvyn Andrews
*Attorney, Agent, or Firm*—Armstrong, Westerman, Hattori, McLeland & Naughton

[57] ABSTRACT

A process for recovering iron values from waste iron oxide, especially iron oxide dust from steelmaking furnaces, wherein the iron oxide is mixed with a water-insoluble thermoplastic material and heated to melt the plastic to form a binder for the iron oxide particles, and discrete bodies formed of the mixture are returned to a furnace to recover the iron values. The plastic binder is present in an amount sufficient to serve as a reductant to reduce the iron oxide to metallic iron when the plastic is combusted with oxygen in the furnace. The invention also includes the discrete bodies so formed of iron oxide and thermoplastic binder.

17 Claims, No Drawings

PROCESS OF RECYCLING IRON OXIDES AND PLASTICS IN STEELMAKING

BACKGROUND OF THE INVENTION

1. Field of the Invention

This invention relates to the use of water-insoluble thermoplastic materials, especially recycled plastics, as a binder and fuel source in the recycling of iron oxides, such as flue dust, in the steelmaking process.

2. Description of Related Prior Art

In the basic oxygen furnace steelmaking processes, and in the electric furnace process, hot, dust-laden gases are generated during the production of liquid steel. The hot gases are evacuated from the steelmaking vessel through a large duct and then cooled to remove the particulate matter. Gas cleaning systems in current use include both wet systems (e.g. venturi scrubbers) and dry systems (e.g. electrostatic precipitators). Dust also can be separated in a hot cyclone. In the wet dust-collection system, water is used to wash the particulates from the gas stream, and the resulting dust-laden water then is further processed to concentrate the solid particles into a sludge containing as much as 50% water by weight. In the dry collection systems, the particulates are collected as a dry dust. In either case, the collected particulates may contain about 55% total iron on a dry basis, with most of the dust in the form of iron oxide. Such dust or sludge generally is disposed in a landfill.

It is known to use synthetic or naturally occurring thermoplastic substances as bonding materials for metallic additives, such as alloying metals, in steelmaking. For example, Frazer U.S. Pat. No. 2,888,342 discloses employing synthetic or naturally occurring thermoplastics as bonding agents for alloying additives such as chromium, silicon, manganese, vanadium, titanium, tungsten, molybdenum, nickel, copper, etc. for addition to ferrous metals in the production of alloy steels and cast iron. Wood rosin is the preferred bonding material.

Lang et al. U.S. Pat. No. 3,644,113 discloses water-soluble graft copolymers of acrylic acid and methyl cellulose, and water-soluble salts thereof, as binders in the pelletization of minerals and ores, such as taconite.

Dingeman et al. U.S. Pat. No. 5,000,783 discloses, as a binder for pelletizing mineral materials, a modified starch and a water-dispersible polymer such as water-dispersible natural gums, pectins, cellulose derivatives, vinyl and acrylic polymers, such as acrylamide, acrylic acid, vinyl alcohol and vinyl acetate, and mixtures thereof.

Rosen et al. U.S. Pat. No. 4,802,914 discloses a method for agglomerating mineral ores comprising commingling a mineral ore concentrate with a binding amount of a water-soluble, high molecular weight polymer such as water-soluble polyacrylamide based polymers.

Clegg et al. U.S. Pat. No. 4,040,818 discloses the use of phenol-formaldehyde compositions as binders in the formation of a briquette containing Mg particles.

Ranke U.S. Pat. No. 3,898,076 discloses the production of alloying briquettes containing alloying materials such as ferro-manganese, ferro-vanadium, ferro-titanium, ferro-columbium, ferro-silicon, silico-manganese, calcium, boron, lithium, magnesium, chromium, zirconium and tungsten, together with a binder consisting of a mixture of a refined paraffin wax and a copolymer of an alkylene compound having 2 to 4 C atoms and a vinyl ester of a 1- to 6-C saturated monobasic aliphatic carboxylic acid, such as an ethylene/vinyl acetate resin copolymer.

Japan Patent Document No. 80-27,687 discloses the addition of 0.1–20 ppm of polyacrylamide binder and aluminum sulfate to a waste scrubbing solution containing Mn dust from an electric furnace.

None of these prior art patents shows the use of water-insoluble thermoplastics as binders for recycling waste particulate iron oxide.

SUMMARY OF THE INVENTION

Therefore, it is an object of this invention to recover waste iron oxide particles, such as flue dust from steelmaking furnaces, and to recycle such material in the steelmaking process. A major portion of the iron oxide flue dust is extremely fine in size, like rouge powder, and is difficult or impossible to bind with normal binders, such as cement or bentonite. The object of the invention is accomplished by mixing such iron oxide particulate matter with a shredded water-insoluble thermoplastic material, especially recycled plastic, melting the thermoplastic material and forming the mixture into agglomerates which can be reintroduced into the steelmaking furnace wherein the plastic material burns, adding reductant and fuel value and aiding in the recovery of the iron values, thereby decreasing or eliminating the need to landfill waste iron oxide and plastic materials and increasing the life of existing landfills. Although steelmaking dust or sludge is given an an example of a material suitable for use in the process of the invention, other materials which are fine in size and rich in iron oxide are also suitable for use in this process.

DESCRIPTION OF PREFERRED EMBODIMENTS OF THE INVENTION

The process of the invention utilizes shredded virgin or, preferably, recycled water-insoluble thermoplastics as a binder to produce an agglomerate from materials which are fine in size and rich in iron oxide, for charging back into the steelmaking process. When so used, the plastic also serves as an internal fuel source to provide energy to melt additional steel scrap and as a reductant to effect the removal of oxygen from the iron oxides contained in the agglomerates.

The ratio of fine iron oxide-containing material to plastic in the agglomerate can be adjusted to achieve the desired operational objective. If the primary objective is to recover iron from the iron oxide-containing material, a ratio of about 5 parts by weight of iron oxide-containing material to 1 part by weight of plastic is adequate. At this ratio, the plastic serves as a binder and also provides the necessary reducing power to convert the iron oxide to metallic iron in the molten state. Increasing the plastic proportion to higher levels provides additional energy for scrap-melting purposes. Thermoplastics useful for the practice of the invention include, for example, polyvinyl chlorides, high density and low density polyethylene, polypropylene, and ABS (acrylonitrile-butadiene-styrene).

In a first embodiment of the invention, in steelmaking shops provided with wet gas-cleaning systems, a portion of the hot dust is removed from the waste gas stream by a hot cyclone or other suitable particulate removal method. That hot dust then is mixed with the wet sludge and shredded plastic in a proportion sufficient to effect drying of the sludge and softening or melting of the plastic prior to agglomeration of the resulting mixture. For this purpose, a mixture temperature of at least about 300° F. and not exceeding about 500° F. is required. In steelmaking shops with a dry gas-cleaning system, again a portion of the hot dust similarly is removed from the waste gas stream and mixed with the dry dust from the main gas cleaning system, and the mixed hot dust is mixed with shredded plastic to soften or melt the plastic in the temperature range of about 300°–500° F. In either case, the hot dust/plastic mixture then is formed by extruding, briquetting, brick pressing, or the like to provide discrete bodies of agglomerate which can be recycled into the steelmaking process.

In a second embodiment of the invention, in steelmaking shops having a wet gas cleaning system, flue dust sludge or filter cake is dried using a direct dryer, such as a spray dryer or a fluidized bed dryer, or an indirect dryer, such as a dryer with a hollow screw through which hot, drying gas is passed. Waste heat streams in a steel plant can be used in the dryer. The hot, dry dust exiting the dryer then is mixed with shredded plastic in proper proportions to effect softening or melting of the plastic. For this purpose, the mixture must be at a temperature in the range from about 300° C. to about 500° C. Agglomeration or forming of the mixture is accomplished as above described, using extruders, briquetting machines, brick presses or other suitable devices.

In a third embodiment, in shops provided with wet gas cleaning systems, sludge is dried as in the above-described second embodiment. In steelmaking shops with dry gas cleaning systems, dry flue dust serves as the direct feed. Other fine, dry iron oxide-containing materials also can serve as the feed material. Shredded plastic is converted to the molten state using conventional extruding equipment to produce pellets. The plastic pellets and dry iron-oxide dust then are mixed and agglomerated, as above described.

In a fourth embodiment, agglomerates composed of steelmaking furnace flue dust, or other fine iron oxide-containing materials, and shredded or pelletized plastic are produced by feeding these individual materials or mixtures of them into batch or continuous high-shear mixers, such as a Banbury-type mixer or continuous compounding equipment of the type generally used in the plastic and rubber industries. In such equipment, the plastic is softened and melted by shear and friction. With the plastic in the molten state, the iron oxide dust is incorporated with the plastic into a homogeneous mixture. A forming die or other shaping device at the compounder discharge provides a desired product shape.

In any case, the formed product, comprising a mixture of iron oxide and plastic is used as a supplemental feed to a basic oxygen furnace or other type of steelmaking furnace, wherein the plastic binder burns, providing a reducing agent for the iron oxide and, depending on the amount of binder used, also providing heat energy to supplement the melting of scrap. For such reaction to proceed, it is necessary that there be sufficient oxygen present in the atmosphere above the liquid metal bath to burn the plastic within the steelmaking vessel. This may require the provision of at least some post-combustion oxygen injected into the vessel.

Operational cost savings by use of the invention can be substantial, in the form of added iron values and the benefit of added energy input by combustion of the plastic component, the amount of the savings depending on the cost of plastic, e.g. recycled plastic, scrap price, and the cost of landfilling waste iron oxide and plastics.

What is claimed is:

1. A method of recovering metallic iron values in waste iron oxide dust, comprising recovering waste iron oxide dust at a temperature sufficient to soften and melt a water-insoluble thermoplastic material, mixing the hot iron oxide dust and the plastic in proportions sufficient to soften and melt the plastic to form a binder for the iron oxide dust, agglomerating the mixture into a particulate form suitable for introduction into a steelmaking furnace, adding the particulate mixture to a steelmaking furnace, and combusting the plastic binder.

2. A method according to claim 1, further comprising injecting oxygen into the furnace to aid in the combustion of the plastic in the furnace.

3. A method according to claim 1, further comprising separating and collecting hot iron oxide dust from a hot off-gas stream from a steelmaking furnace, and mixing a sufficient proportion of the hot dust with particulate thermoplastic material to provide a mixture temperature sufficient to soften and melt the plastic.

4. A process according to claim 3 wherein the mixture temperature is about 300° F. to about 500° F.

5. A process according to one of claims 1, 2 and 3, wherein the proportion of plastic to iron oxide is at least about 1 part by weight of plastic to 5 parts by weight of iron oxide and combustion of the plastic binder reduces the iron oxide to metallic iron.

6. A process according to claim 3, further comprising wet cleaning of a major portion of the hot off-gas to form a wet sludge, separating a minor portion of hot dry dust from the hot off-gas, and mixing the minor portion of hot dry hot dust, wet sludge and particulate thermoplastic material in proportions sufficient to provide a mixture temperature sufficient to soften and melt the plastic.

7. A process according to claim 6, wherein the mixture temperature is about 300° F. to about 500° F.

8. A process of recovering metallic iron values in waste iron oxide dust from an off-gas stream from a steelmaking furnace, comprising wet cleaning the off-gas to form a wet sludge comprising iron oxide dust, drying the sludge by heating the sludge under conditions such that a mixture of dried sludge and particulate thermoplastic added to the dried sludge has a temperature sufficient to soften and melt the thermoplastic, agglomerating the iron oxide-thermoplastic mixture into a particulate form suitable for introduction into a steelmaking furnace, adding the particulate mixture to a steelmaking furnace, and combusting the plastic binder.

9. A process according to claim 8, wherein the mixture temperature is about 300° F. to about 500° F.

10. A process according to claim 8, wherein the proportion of plastic to iron oxide is at least about 1 part by weight of plastic to about 5 parts by weight of iron oxide and combustion of the plastic binder reduces the iron oxide to metallic iron.

11. A process of recovering metallic iron values in waste iron oxide dust from an off-gas stream from a steelmaking furnace, comprising wet cleaning the off-gas to form a wet sludge comprising iron oxide dust, drying the sludge by heating the sludge under conditions such that a mixture of dried sludge and particulate thermoplastic added to the dried sludge has a temperature sufficient to soften and melt the thermoplastic, pelletizing a water-insoluble thermoplastic material, adding the thermoplastic pellets to the dried sludge, agglomerating the hot mixture into a particulate form suitable for introduction into a steelmaking furnace, adding the particulate mixture to a steelmaking furnace, and combusting the plastic binder.

12. A process according to claim 11, wherein the mixture temperature is about 300° F. to about 500° F.

13. A process according to claim 11, wherein the proportion of plastic to iron oxide is at least about 1 part by weight of plastic to 5 parts by weight of iron oxide and combustion of the plastic binder reduces the iron oxide to metallic iron.

14. A process of recovering metallic iron values in waste iron oxide dust from an off-gas stream from a steelmaking furnace, comprising dry cleaning the off-gas and separating a hot iron oxide dust fraction having a temperature sufficient to provide a temperature of about 300° F. to about 500° F. when mixed with the balance of the dry iron oxide and a water-insoluble thermoplastic material in a proportion of at least 1 part by weight of plastic to 5 parts by weight of iron oxide, pelletizing the thermoplastic material, adding the thermoplastic pellets to the iron oxide dust, agglomerating the mixture into a particulate form suitable for introduction into a steelmaking furnace, adding the particulate mixture to a steelmaking furnace, and combusting the plastic binder to reduce the iron oxide to metallic iron.

15. A process of recovering metallic iron values in waste iron oxide dust, comprising collecting the dust in dry form, adding the dry dust together with particulate water-insoluble thermoplastic material to a high shear mixer, mixing the dry iron oxide dust and the thermoplastic material in the mixer to a temperature sufficient to soften and melt the thermoplastic material to provide a binder for the iron oxide dust, extruding the hot mixture through a forming die and cooling and forming the extrudate into the form of discrete bodies suitable for introduction into a steelmaking furnace, adding the discrete bodies to a steelmaking furnace, and combusting the binder in the presence of oxygen in the furnace.

16. A process according to claim 15, wherein the proportion of plastic to iron oxide is at least about 1 part by weight of plastic to about 5 parts by weight of iron oxide and combustion of the plastic binder reduces the iron oxide to metallic iron.

17. A process according to one of claims 8, 11, 14 and 15 further comprising injecting oxygen into the furnace to aid in the combustion of the thermoplastic binder.

* * * * *